C. DENTON.
HARVESTER.

No. 179,646.  Patented July 11, 1876.

UNITED STATES PATENT OFFICE.

CHARLES DENTON, OF PEKIN, ASSIGNOR OF ONE-HALF HIS RIGHT TO ANDREW J. HODGES, OF PEORIA, ILLINOIS.

IMPROVEMENT IN HARVESTERS.

Specification forming part of Letters Patent No. 179,646, dated July 11, 1876; application filed March 4, 1876.

*To all whom it may concern:*

Be it known that I, CHARLES DENTON, of Pekin, in the county of Tazewell, and in the State of Illinois, have invented an Improvement in Harvesters; and do hereby declare that the following is a full, clear, and exact description thereof, reference being had to the annexed drawings, making a part of this specification, in which like letters of reference refer to like parts, and in which—

Figure 1:
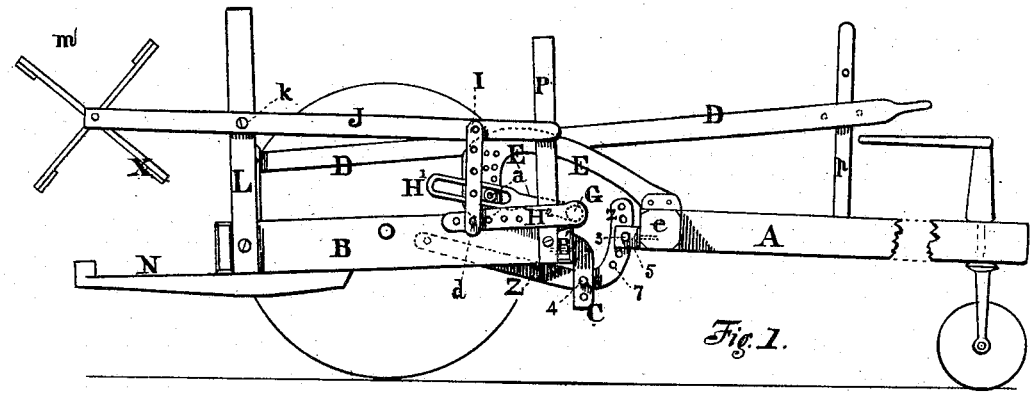
Figure 2:
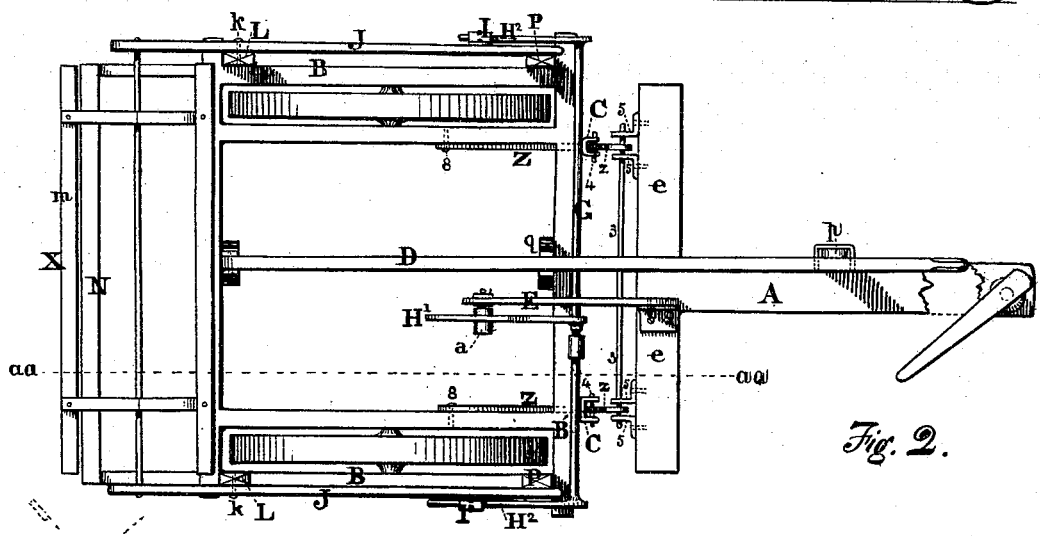
Figure 3:
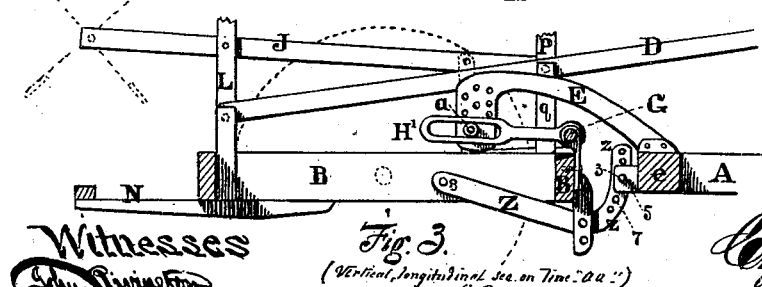

Figure 1 represents a longitudinal elevation; Fig. 2, a superficial view; Fig. 3, a vertical longitudinal section on line $a\,a$, Fig. 2.

This improvement relates to that class of harvesters called "headers," in which the propelling power is in the rear.

It is frequently desirable to make the adjustment of the reel perhaps fifteen or twenty times in cutting a single piece of grain, as a part of the field may be of tall growth, and another part of very short growth, or even "lodged," or tangled, in which case the sickle must be lowered and the reel must approach close to the sickle in order to save all the crop. To accomplish this desirable movement of the reel, I use an arched or bent arm, E, attached to the cross-head $e$ of the thrust-bar or tongue, A, which is jointed to the main frame B. Said bent arm is provided with a friction-roller, $a$, made adjustable by means of several convenient holes in any part of its outer extremity, in such a manner as to be adjustably engaged with an arm, $H^1$, on a transverse rocking-shaft, G, mounted on the rear end of said frame B. Said friction-roller $a$ is so made adjustable by means of said holes, and by engagement within a slot in the end of said arm $H^1$ of said shaft, as to suit the various heights, or changes of level of said cross-head $e$ and tongue A, in raising or lowering the front of the main frame in cutting or reaping at a low level. The connecting-points between said arched bar E and the rocking-arm $H^1$, as described, may be reversed, *i. e.*, the slot placed in the arched bar or arm E, and the friction-roller $a$, or a pin, transferred to the rocking-arm $H^1$. So, too, the arched arm E may stand erect and operate the same way, and with equal effect, upon an erect rocking-arm, $H^1$, and these, in conjunction, may be placed at either end of the cross-head $e$, or be identified with the end arms $H^2\,H^2$, which move the reel-bars J J. On the extremities of said rocking-shaft G are mounted the respective arms $H^2\,H^2$, projecting forward at a similar angle to their fellow, $H^1$, also provided with several adjusting pin-holes in their respective extremities, in which are bolted or keyed or otherwise pivoted swivels-links I, also made adjustable, each of which at the other extremities are pivoted to the rear end of the respective reel-bars J J, (reel-supports.) These bars J are each pivoted near its center to a standard, over the harvester platform or frame, to allow of an upward and downward motion of the reel X, which motion is graduated or adjusted to a nicety by means of the adjustable link and arm connections described.

The operation of this reel adjustment is as follows: By raising the lever D the sickle is depressed, simultaneously with which the arched arm E rises, carrying up the rocking-arm $H^1$, so as to depress the forward end of the levers J J and the reel X, the latter descending (much faster than the sickle-bar and front of the reaping platform is then moving) to the proper working distance from said bar. On the contrary motion of the platform the reel moves upward at a greater speed than that of the former, so increasing its distance from the sickle, varying distances which are very desirable in cutting grain of various heights. It is also desirable in carrying out the objects mentioned to provide an adjustable connection between the thrust-bar head $e$ and the frame B, with the additional object of properly distributing the strain on the frame B, in such a manner as to obviate the tendency of the thurst-bar either to depress or to raise the cutter unduly. To do this, *i. e.*, secure an even propulsion of the tongue upon the frame, or even balance of the latter, upon its wheels, I use an adjustable coupling or hinge on either side of the frame, consisting of two bars, Z, each pivoted to one of the lateral pieces of the frame, having a curved head, $z$, and its middle portion adjustably held in a jaw, C, attached to the rear of the frame B, by means of a series of bolt-holes, 7, in the curved head of the bar. Said bar can also be adjusted to the pivot-blocks 5 by means of bolts or transverse pivotal rod, 3.

The operation of this coupling is as follows: By changing the pins or bolts 4 in the holes 7 in the head $z$ of the arm Z and jaws C, or of the coupling of the curve $z$, to the pivot-blocks 5 of the cross-head $e$ of the thrust-bar A, an even propulsion and balancing of the frame B are secured.

What I claim as my invention is—

1. The rocking-shaft G, mounted on the rear of the wheel-frame, and provided with an arm or arms, $H^1$, having a slotted or sliding connection with a stationary arm, E, on the tongue A, or its cross-head, and a second arm or arms, $H^2$ $H^2$, having adjustable connections with a link or links, I I, of the reel-bar or bars J J, substantially as described.

2. The combination, with the frame B, of the pivotal bars Z Z, the jaws C C, said bars Z Z adjustably adapted for connection to the pivotal blocks 5 5 of the cross-head $e$ of the tongue A, substantially as and for the purposes described.

In testimony that I claim the foregoing improvement in harvesters I have hereunto set my hand this 9th day of November, A. D. 1875.

CHARLES DENTON.

Witnesses:
  HENRY W. WELLS,
  GEO. H. KETTELLE.